United States Patent [19]

DeSchaaf et al.

[11] Patent Number: 4,643,350
[45] Date of Patent: Feb. 17, 1987

[54] WATER TEMPERATURE SENSING AND CONTROL MEANS FOR AUTOMATIC WASHER

[75] Inventors: Clifford L. DeSchaaf; Bruce L. Reniger, both of Lincoln Township, Berrien County, Mich.

[73] Assignee: Whirlpool Corporation, Benton Harbor, Mich.

[21] Appl. No.: 809,725

[22] Filed: Dec. 17, 1985

[51] Int. Cl.⁴ .......................................... D06F 33/00
[52] U.S. Cl. ........................... 236;12.12; 8/158; 68/12 FA; 374/147
[58] Field of Search ............ 236/12.12, 12.1, 12.11, 236/DIG. 12; 62/158; 364/502; 8/158; 68/12.3; 374/147, 102; 4/192-194

[56] References Cited

U.S. PATENT DOCUMENTS

| | | | |
|---|---|---|---|
| 3,487,996 | 1/1970 | Lofgren | 236/12.12 |
| 3,707,857 | 1/1973 | Wigfall | 68/12.3 |
| 3,927,571 | 12/1975 | Athey | 73/362 |
| 4,031,911 | 6/1977 | Frazar | 137/3 |
| 4,147,297 | 4/1979 | Worst | 68/12.3 |
| 4,161,881 | 7/1979 | Raz | 374/147 |
| 4,179,680 | 12/1979 | Heybey | 62/156 X |
| 4,184,340 | 1/1980 | Laughlin et al. | 62/158 X |
| 4,241,868 | 12/1980 | Perkins | 236/94 X |
| 4,330,081 | 5/1982 | McMillan | 68/12.3 |
| 4,361,274 | 11/1982 | Raleigh et al. | 236/21 B |
| 4,406,401 | 9/1983 | Nettro | 236/12.12 |
| 4,420,811 | 12/1983 | Tarnay et al. | 364/510 |
| 4,503,575 | 3/1985 | Knoop et al. | 8/158 |
| 4,528,709 | 7/1985 | Getz et al. | 236/12.12 X |

Primary Examiner—William E. Wayner
Attorney, Agent, or Firm—Hill, Van Santen, Steadman & Simpson

[57] ABSTRACT

A water temperature sensing and control apparatus for automatic washers having a thermistor mounted within a projection that extends into a water inlet stream in a water inlet housing. A thermally semiconductive potting material encases the thermistor to provide a delayed response of the sensor to changes in water inlet temperature. A control circuit connected to the thermistor includes a pair of comparators for controlling hot and cold water inlet valves in response to the sensed temperature to achieve one of a plurality of selectable wash bath temperatures.

10 Claims, 10 Drawing Figures

WATER TEMPERATURE SENSING AND CONTROL MEANS FOR AUTOMATIC WASHER

BACKGROUND OF THE INVENTION

1. Field of the Invention

The present invention relates generally to a water temperature sensor and control circuit for use in an automatic washer.

2. Description of the Prior Art

It is known in the art to provide a fluid temperature monitoring and indicating system for use with a manually operated faucet. For example, U.S. Pat. No. 4,406,398 discloses a control circuit connected to a thermistor mounted in the water outlet of the faucet that includes two comparators which energize lights to indicate which of the hot or cold water valve is to be operated to achieve a desired temperature range. No time delay or automatic temperature adjusting means are provided.

It is also generally known to mount a temperature sensor within a body of synthetic resin. U.S. Pat. No. 4,179,680 discloses a freezer having a relatively large two-part resin body having a temperature sensor mounted therein to provide a time delay of approximately 10 minutes so that defrosting operations are not detected as malfunctions.

A microprocessor controlled water temperature control system for an automatic washer is disclosed in U.S. Pat. No. 4,406,401 wherein temperature sensors in each of the hot and cold inlet lines are monitored and a program control sets percentages of open time for the valves.

While the foregoing references and citations do not exhaust the known microprocessor based temperature controls in washers, they do represent what is believed to be a representative cross-section of the prior patented art.

SUMMARY OF THE INVENTION

It is an object of the present invention to provide, within the limits established by hot and cold water inlet temperatures, a controlled water temperature for hot, warm, and cold wash cycles of an automatic washer with the provision of a single circuit module and related sensor assembly to be used without modification in a wide variety of automatic washer controls, including both conventional electromechanical controls and microprocessor based controls.

It is a further object of the present invention to provide a water temperature control circuit that prevents undesirable rapid cycling of the water inlet valves, thereby reducing noise and prolonging valve life.

These and other objects are embodied in a water temperature sensor and control circuit arrangement for an automatic washer which includes a temperature sensor encased in a thermally semiconductive material at a water inlet and linked to a control circuit having a window comparator arrangement for controlling water inlet valves. The present arrangement senses water temperature entering a wash bath and controls the operation of the appropriate water valves so that the average temperature of the water entering the wash bath will be at or near one of three selectable temperature levels, namely, hot, warm or cold.

A sensor, such as a thermistor, is mounted in a projection formed in a water inlet housing and is encased in thermally insulating potting material filling the projection. The thermally insulating potting material in combination with the material of the water inlet housing and the sensor itself provides a time delay in the thermal response of the sensor to changes in the temperature of incoming water. The projection in which the sensor is mounted is downstream of the hot and cold water inlets and is arranged to minimize stratification and other temperature discontinuities at the sensor location which can be caused by unmixed hot and cold water streams.

A control circuit is connected to the thermistor and includes a window comparator to monitor temperature changes detected by the thermistor and to control the hot and cold water inlet valves in response thereto. The control circuit also includes means for selecting one of a plurality of temperatures for the fill water. One embodiment of the control circuit includes buffers between the window comparators and other portions of the circuit as well as a hysteresis feedback resistor arrangement to prevent oscillations of the circuit and, accordingly, establish a minimum cycle time for the valves under the worst case conditions.

While it is possible to control valve cycling by using a microcomputer to process temperature data and compute cycling times, the present invention utilizes the thermal characteristics of a temperature sensor assembly and the response characteristics of a circuit to control valve cycling without the need for microcomputer control. The present system requires only a pair of switched inputs to indicate the desired fill temperature and a switched power line for the valve solenoids; thus, it may be used either with a microprocessor based appliance control or with a control that uses a conventional electromechanical timer.

DESCRIPTION OF THE PREFERRED EMBODIMENTS

Figures 1, 4, 5, 6:
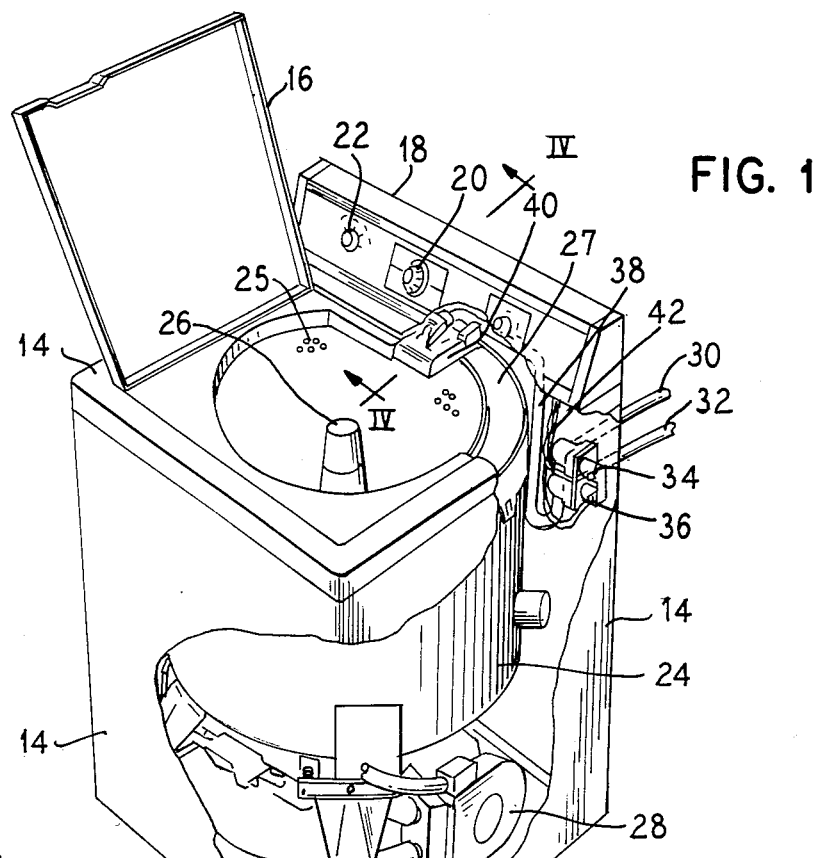
FIG. 1 is a perspective view of a clothes washer including the device of the present invention.
FIG. 4 is a cross-section of the water inlet and sensor housing of FIG. 1 along the lines IV—IV.
FIG. 5 is an enlarged view of a portion of FIG. 4.
FIG. 6 is a cross-section of the housing of FIG. 4 along the lines VI—VI.

In FIG. 1, reference numeral 10 indicates generally a washing machine of the automatic type, i.e., a machine having a pre-settable sequential control means for operating a washer through a pre-selected program of automatic washing, rinsing and drying operations. The machine 10 includes a frame 12 carrying vertical panels 14 forming the sides, top, front and back of the cabinet for the washing machine 10. A hinged lid 16 is provided in the usual manner to provide access to the interior or treatment zone of the washing machine 10. The washing machine 10 has a console 18 including a timer dial 20 and a temperature selector 22.

The principles of the present invention are applicable to a so-called overflow rinse type machine or to a spin rinse machine, depending on whether or not there is utilized a perforate spin basket.

Internally of the machine 10 described herein by way of examplification there is disclosed a imperforate fluid containing tub 24 within which is a perforate spin basket 25 and vertically disposed agitator 26, while a pump 28 is provided below the tub 24. Water is supplied to the imperforate tub 24 by hot and cold water supply lines 30 and 32, respectively, which are connected to respective hot and cold mixing valves 34 and 36. The mixing valves 34 and 36 are connected to a water fill conduit 38 which leads to a water inlet and sensor housing 40 mounted adjacent to the upper edge of the imperforate tub 24. The hot and cold mixing valves 34 and 36 are controlled through leads 42 connected thereto by electrical circuit (not shown) contained within the console 18.

Figure 2:
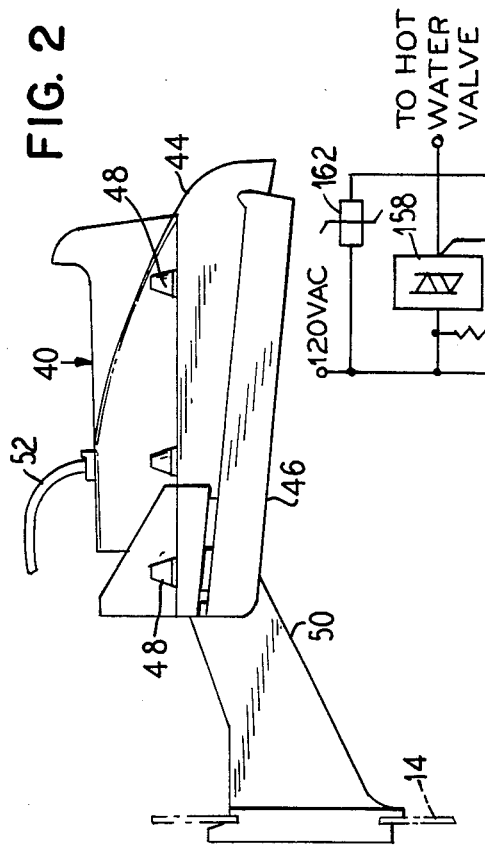
FIG. 2 is a side elevational view of a water inlet and sensor housing shown in FIG. 1.

The water inlet and sensor housing 40 is shown in FIG. 2. The housing 40 may be formed of polypropylene and includes a top member 44, a bottom member 46 and a plurality of connecting means 48 securing the top member 44 to the bottom member 46. A brace 50 mounts the housing 40 on a panel 14 of the washer, such as a back panel. Sensor leads 52 extend from the housing 40 and are connected thereto to a sensor as will be described hereinafter.

Figure 3:
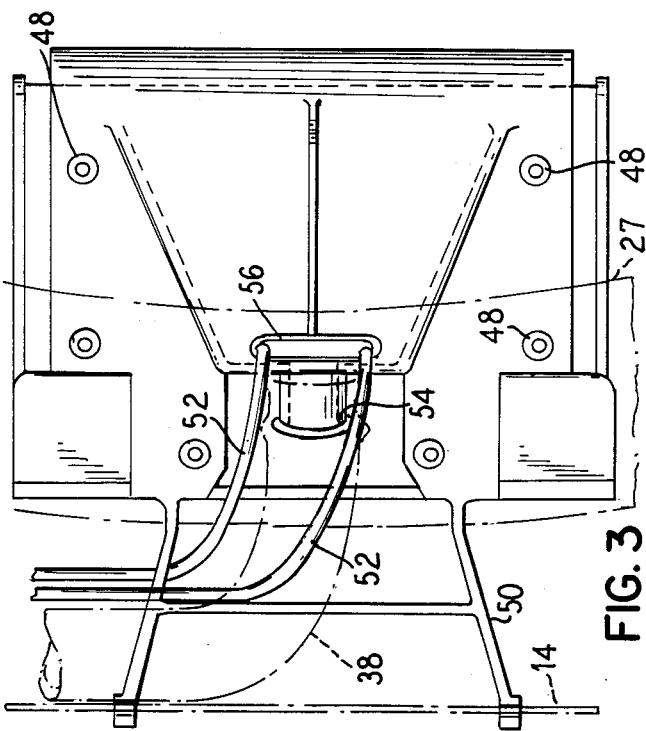
FIG. 3 is a plan view of the housing of FIG. 2.

In FIG. 3, the housing 40 can be seen from above, including the water fill conduit 38 connected to a fitting 54 on the housing 40. A sensor mounting 56 extends transversely of the direction of water flow as water enters the housing 40 from the fill conduit 38. In FIG. 4, the water inlet and sensor housing 40 is shown in cross-section to reveal the feature of a vacuum break, as is known in the art. A shaped vane 60 extends upwardly from the housing 40 and engages the top panel 14 of the washing machine 10 to serve as a spacer. This figure also shows the proximity of the housing 40 to the wash basket 25 and an annular tub ring 27.

The sensor mounting 56 is in the top member 44 immediately adjacent the fitting 54 through which water is projected into the housing 40. As can be seen more clearly in FIG. 5, the sensor mounting 56 includes a trough shaped recess 62 in which a temperature sensing unit 64, such as a thermistor, is mounted. A bottom wall 66 of the trough shaped recess 62 is thin relative to the housing 40. The recess 62 is filled with a potting compound 68, which in a preferred embodiment is an epoxy resin which has the characteristics of being thermally semiconductive. By way of example, this resin may be a cycloaliphatic epoxide such as Part No. 8008, available from the State Tool and Manufacturing Company, of Benton Harbor, Mich.

The sensor leads 52 extend outward from the potting compound 68. The recess 62 may include upwardly extending walls 70 therearound for holding the potting compound 68. One or more retaining members 71 may be provided in the recess 62 to hold the thermistor 64 in proper spaced relation to the wall 66 during the pouring and setting of the potting compound 68. In a preferred embodiment, the sensor 64 is a glass encapsulated, hermetically sealed thermistor which prevents drift due to the humid environment in which the thermistor is located. An example of one such thermistor is model number PIH503, sold by Midwest Components, Inc. of Muskegon, Mich.

In FIG. 6, the thermistor 64 is shown positioned within the recess 62 in the path of incoming water entering through a circular water inlet 72 in the water inlet housing 40.

Figure 7:
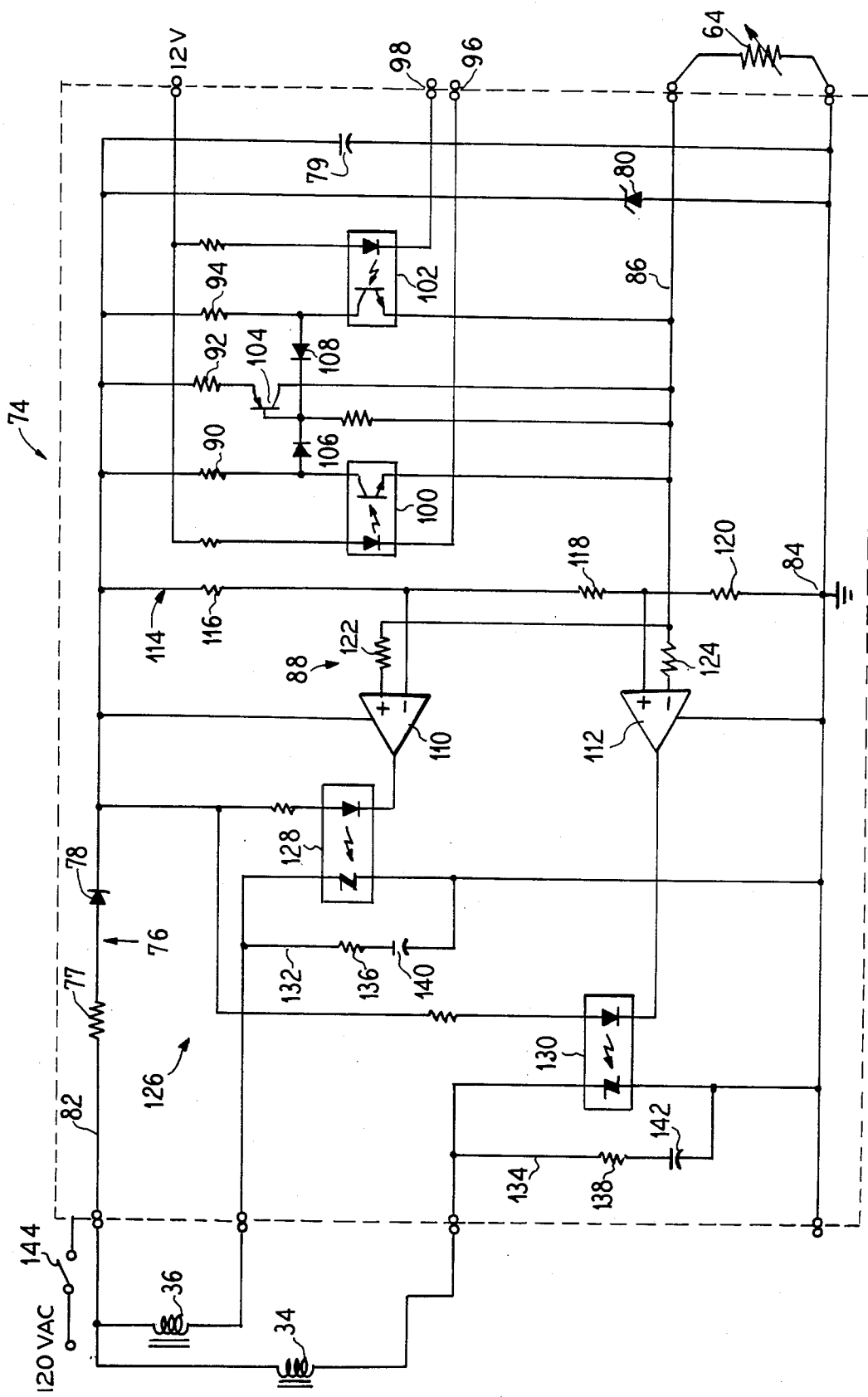
FIG. 7 is a circuit diagram of a control circuit according to the principles of the present invention.

FIG. 7 shows a control circuit 74 of the present invention for controlling the operation of the hot and cold inlet valves 34 and 36 in response to temperature changes sensed by the thermistor 64. The control circuit 74 includes a power conditioning portion 76 having a dropping resistor 77 and a diode 78 connected in series with a capacitor 79 and a parallel zener diode 80, connected between a 120 volt A.C. line 82 and ground 84. The power conditioning portion 76 provides a low current D.C. signal to the control circuit 74. The thermistor 64 is connected between ground 84 and a temperature signal lead 86. The temperature signal lead 86 is connected to a window comparator circuit 88 that provides temperature monitoring.

Between the power supply 76 and the window comparator 88 is a resistance bridge composed of resistors 90, 92 and 94 which are switched into the circuit 74 by switched inputs 96 and 98. The switched input 96 is connected to the input portion of an opto-coupler 100, while the switched input 98 is connected to the input portion of an opto-coupler 102. Upon connection of the switched input 96 to ground a photo-transistor portion of the opto-coupler 100 is caused to conduct, thereby linking the thermistor 64 in series with the resistor 90. Similarly, connection of the switched input 98 to ground activates a photo-transistor portion of the opto-coupler 102 which links the resistor 94 in series with the thermistor. When no signal is present on either of the inputs 96 and 98, resulting in neither resistor 90 nor resistor 94 being in the circuit, current flows through the diodes 106 and 108, causing a positive voltage at the base of the transistor 104, and switching it to a conducting state. This links the resistor 92 in series with the thermistor 64 to correct for thermistor nonlinearity. The transistor 104 essentially functions as a NOR gate, assuming a conducting state when no signal is present on either of the inputs 96 and 98. The switched inputs 96 and 98, by control of which the resistors 90, 92 and 94 are placed in series with the thermistor 64, control the voltage level on temperature signal lead 86.

The window comparator 88 includes first and second comparators 110 and 112 and a voltage divider network 114 connected thereto. The voltage divider 114 is formed of resistors 116, 118, and 120 with an inverting input of the comparator 110 being connected between the resistors 116 and 118 and a noninverting input of the comparator 112 being connected between the resistors 118 and 120. The temperature signal from the thermistor 64 is fed to the comparator 110 at a noninverting input and to the comparator 112 at an inverting input through resistors 122 and 124, respectively. The voltage divider 114 provides first and second reference levels for the respective comparators 110 and 112, and the window comparator 88 thus provides a hysteresis function in responding to the temperature signal from the thermistor 64.

A valve switching portion 126 of the circuit includes optical couplers 128 and 130 which, in the preferred embodiment, are opto-triacs. A signal from the comparator 110 energizes the optical coupler 128, thereby causing a triac portion thereof to conduct and operate the cold water valve 36. Similarly, operation of the comparator 112 energizes the optical coupler 130 causing the triac portion thereof to operate the hot water valve 34. The opto-triac couplers 128 and 130 include triac snubber networks 132 and 134, respectively, which each consist of a resistor 136, 138 in series with a capacitor 140, 142. A power supply control means 144 supplies 120 volt A.C. power to line 82 and is closed only during the fill portions of the wash cycle. The signals at the switched inputs 96, 98 and 144 can be provided or controlled by either an electromechanical timer 20 or a microprocessor based control for the washer 10, both types of such controls being conventional.

Figure 8:
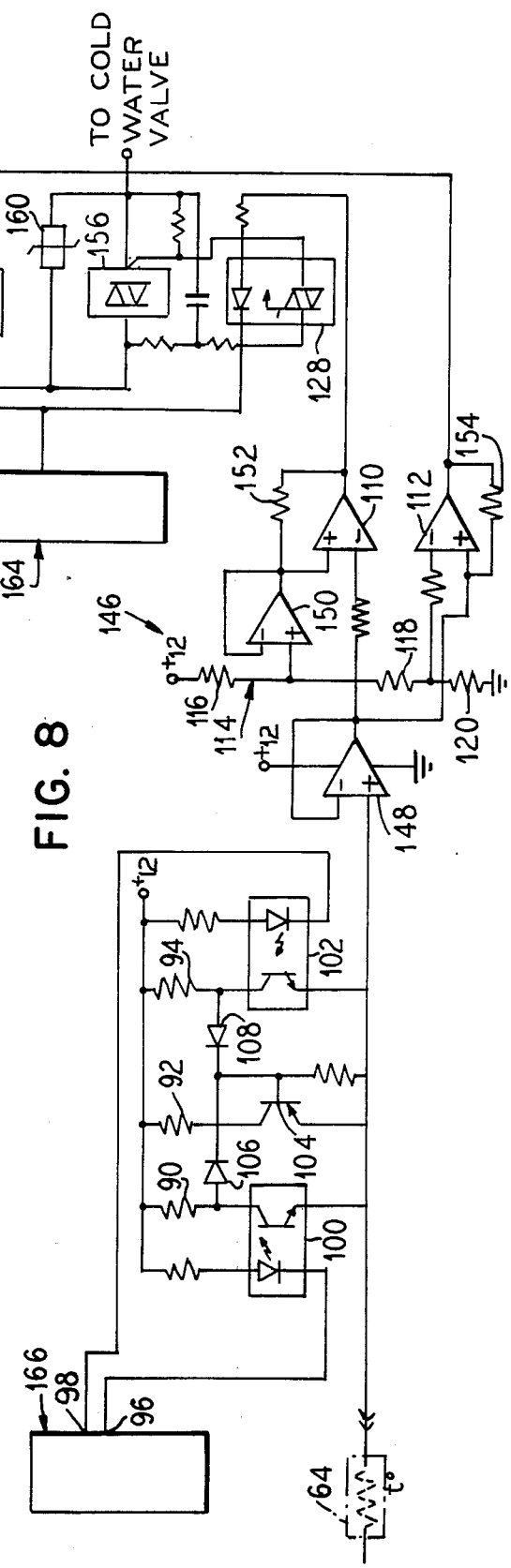
FIG. 8 is another embodiment of a control circuit of the present invention.

FIG. 8 shows a second embodiment of a control circuit 146 for use in the present invention. The control circuit 146 includes the thermistor 64, opto-couplers 100 and 102, resistors 90, 92 and 94, transistor 104 and comparators 110 and 112 of the above-described control circuit 74. The second embodiment of circuit 146, however, also includes a pair of buffers 148 and 150 connected to the inputs of the comparators 110 and 112 to isolate changes in impedance caused by switching within the resistance bridge from the comparators 110 and 112. The buffer 148 is connected at its noninverting input to the thermistor 64 and its output is connected to the respective inverting and noninverting inputs of the comparators 110 and 112. The second buffer 150 links an intermediate position on the voltage divider network 114 to the noninverting input of comparator 110.

An additional feature of the second embodiment is the addition of feedback resistors 152 and 154 to the respective comparators 110 and 112. The feedback resistors 152 and 154 prevent oscillation of the output signals from the respective comparators 110 and 112 and thus provide a delay in the operation of the water control valves 34 and 36 in addition to the thermal delay of the sensor 64.

As in the circuit of FIG. 7, the comparators 110 and 112 feed LED portions of optical triacs 128 and 130, respectively. The triac portions of the opto-triacs 128 and 130, however, are connected in this second embodiment to triacs 156 and 158, respectively, in parallel with current stabilizing elements 160 and 162, respectively, to operate the respective cold and hot water valves 36 and 34. In the circuit 146, a fill control means 164 is connected to the LED portions of the opto-triacs and controls the application of power to these devices, thus providing a function similar to that of the power supply control means 144 of the previous circuit embodiment. The fill control means 164 may be program controlled, as by a microprocessor, or may be mechanically controlled. A temperature selection means 166 is provided at the switched inputs 96 and 98 which may likewise be either program controlled or mechanically controlled.

Figure 9:
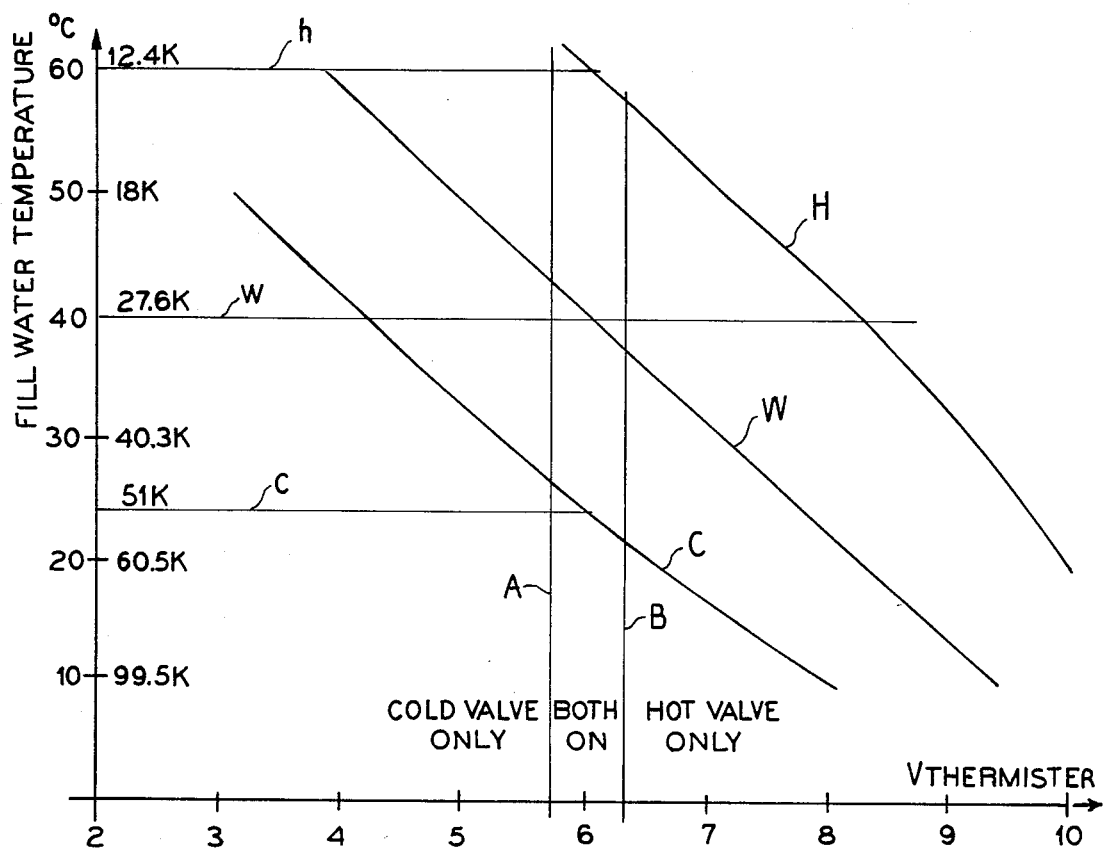
FIG. 9 is a graph showing three fill water temperature modes as related to the water temperature and the thermistor voltage.

FIG. 9 is a graph depicting the thermistor response to changes in fill water temperature, as biased for each of the three water temperature modes. The manner in which the hot and cold inlet valves 34 and 36 are cycled in response to the temperature of the water being delivered to the housing 40 can be determined from this graph. Desired wash bath temperatures for the hot, warm and cold modes are indicated by the horizontal lines h, w and c, which for a particular thermistor bias correspond to a resistance value at each of the temperatures. The vertically oriented parallel lines A and B indicate the opening or closing of the water control valves 34 and 36, as determined by the first and second voltage reference levels established by the voltage divider 114. More specifically, the left line indicates the hot water valve opening or closing while the right line indicates the cold water valve opening or closing. The operation of the thermistor is depicted by lines H, W and C at each of the temperatures h, w and c, respectively. The resistors 90, 92 and 94 provide biasing for the thermistor 64 and thus determine which of the operating modes H, W or C will occur. The intersection of the lines h, w and c with respective lines H, W and C are each within the lines A and B for accurate temperature control.

As can be seen in the graph of FIG. 9, the selection of the cold water mode not only opens the cold water valve but also cycles the hot water valve opened and closed to warm the incoming cold water somewhat for better detergent performance. On the other hand, the hot mode, under normal conditions, does not result in opening and closing of the cold water inlet valve.

Figure 10:
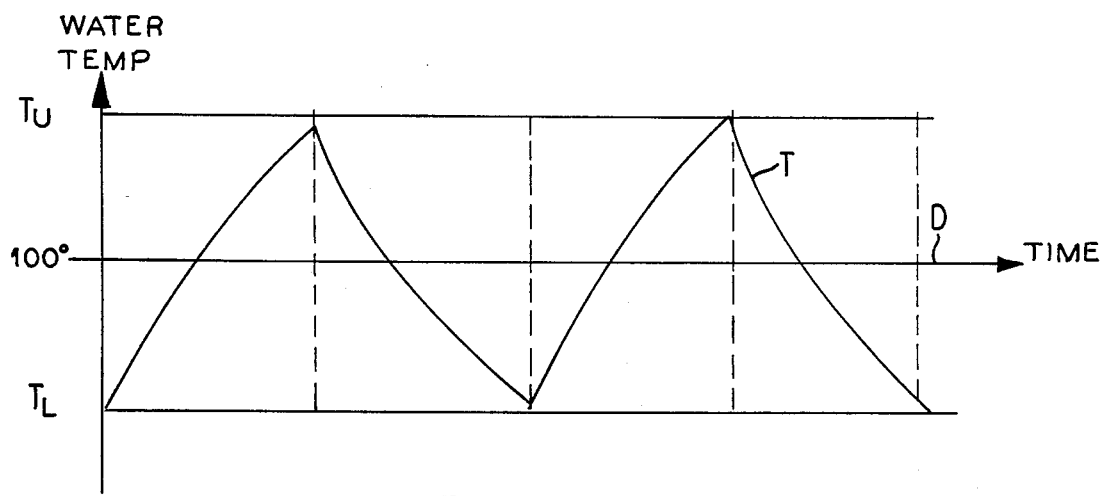
FIG. 10 is a time graph showing the effect on water temperature of valve cycling.

In the present embodiment, the hot and cold water valves are operated so that each is either fully open or completely closed. Consequently, the temperature of the incoming water is usually either above or below the desired wash bath temperature at any particular time, as shown in FIG. 10. As each of the valves cycle open and closed, the incoming water temperature, line T, varies about the desired wash bath temperature D between upper and lower temperature trip points $T_U$ and $T_L$. The resulting wash bath will approximate the desired temperature D. The thermal time delay of the thermistor provided by the potting material, and any additional delay provided by the control circuit, controls the time between cycling of the valves to prevent rapid cycling, which minimizes noise and wear, but still results in the desired wash bath temperature for each wash mode.

The present control operates as follows. During the fill portion of a wash cycle, the incoming water temperature is sensed by the thermistor. This sensing function is delayed, or thermally integrated, as a result of the above described location and mounting arrangement of the sensor 64. The voltage across the thermistor, as determined by the temperature mode setting resistors 90, 92 and 94 is inversely proportional to the sensed temperature. This voltage is compared to the preset first and second reference values by the window comparator arrangement 88. If the thermistor voltage is higher than either reference voltage (water too cold), the cold valve is turned off and the hot valve is turned on. As the thermistor voltage decreases (water warms), the cold valve is turned on along with the hot valve. Should the voltage continue to decrease (water becomes hot), the hot valve is turned off leaving only the cold valve open. This operation is repeated until the wash bath has filled the tub 24 to the desired level. Of course, the selected wash bath temperature must lie between the hot and cold water supply temperatures for proper operation. The present control will not only correct for variations in supply temperature, but will also correct for variations in temperature due to flow rate variations such as a reduction in the hot water flow due to other concurrent use of hot water in the home during a fill operation. The thermal integrating effect of the thermistor sensor allows for the compensation of a flow rate variation to occur.

Although the present device may be used with a variety of inlet temperatures, normal temperature conditions are generally hot water inlet temperatures of approximately 140° F. and cold water inlet temperatures of approximately 55° F. With these inlet temperatures, a preferred embodiment of the present apparatus will produce, within a 10° F. tolerance, a 140° F. hot water fill, a 100° F. warm water fill, and a 75° F. cold water fill. As noted above, the cold water fill utilizes some hot water to raise the temperature above the 55° F. inlet level to enable even a cold water detergent to wash more effectively.

The present invention senses the temperature of the water entering the wash bath, rather than the temperature of the wash bath itself. The temperature of the inlet water is controlled by cycling the appropriate water valves so that the average temperature is within the aforementioned tolerance of the desired temperature. The thermal characteristics of the temperature sensor assembly reduces the rate or frequency with which the valves are cycled, thereby minimizing noise and wear. In the second embodiment of the control circuit, feedback is provided for an additional time delay, although the circuit delay is preferably less than that of the thermal sensor assembly.

Under the above-described normal inlet temperature conditions, the circuit will cause the valves to cycle at intervals of generally within the range of 15 to 30 seconds, although the precise rate at which the valve cycle will vary is a function of the water inlet temperature, of the inlet pressure, the thermal time delay built into the sensor assembly, and the electrical time delay built into the circuit.

In a worse case condition, for example, when the hot water inlet temperature is only a few degrees above the 100° F. desired warm fill temperature, and the control is set for a warm fill, there would ordinarily be rapid cycling of the inlet valves. In the present device, however, a minimum cycle time is established by the comparator feedback which, in conjunction with the thermal delay of the sensor, will not result in rapid cycling.

It is apparent from the foregoing specification that the invention is susceptible to being embodied with various alterations and modifications which may differ particularly from those that I have described in the preceding specification and description. It should be understood that I wish to embody within the scope of the patent granted hereon all such modifications as reasonably and properly come within the scope of my contribution to the art.

The embodiment of the invention in which an exclusive property or privilege is claimed are defined as follows:

1. In an automatic washer having means for containing a wash bath, hot and cold inlet valves connected to respective sources of hot and cold water, and means for delivering a combined flow of water from said valves to said wash bath, improved means for controlling the temperature of water delivered to said wash bath comprising:
   a temperature sensor mounted to sense the temperature of said combined flow of water to said wash bath;
   means forming a thermally semiconductive layer between said temperature sensor and said combined flow to provide a predetermined delayed response of said sensor to temperature changes of said combined flow;
   temperature control means for establishing a desired water bath temperature;
   a valve control circuit connected to control said inlet valves, said circuit being connected to said sensor and said temperature control means and being responsive to signals therefrom to operate said valves such that an average temperature of said flow of water to said wash bath is substantially equal to said desired water bath temperature;
   means in said valve control circuit for providing a time delay, said time delay being shorter than said sensor delayed response.

2. An improved control means as claimed in claim 1, wherein said circuit time delay means includes feedback means to prevent oscillations of the circuit and establish a minimum cycle time for operating the valves activated by the valve circuit.

3. In an automatic washer having means for containing a wash bath, hot and cold inlet valves connected to respective sources of hot and cold water, and means for delivering a combined flow of water from said valves to said wash bath, improved means for controlling the temperature of water delivered to said wash bath comprising:
   a temperature sensor mounted to sense the temperature of said combined flow of water to said wash bath;
   means forming a thermally semiconductive layer between said temperature sensor and said combined flow to provide a predetermined delayed response of said sensor to temperature changes of said combined flow;
   temperature control means for establishing a desired water bath temperature;
   a valve control circuit connected to control said inlet valves, said circuit being connected to said sensor and said temperature control means and being responsive to signals therefrom to operate said valves such that an average temperature of said flow of water to said wash bath is substantially equal to said desired water bath temperature;
   a projection extending from said delivering means into said combined flow of water, said temperature sensor being disposed within said projection and having said thermally semiconductive means disposed between said sensor and said combined flow to provide time delay in the thermal response of the temperature sensor;
   wherein said projection is a trough extending transversely of said combined flow, thereby to provide a thin wall relative to the housing.

4. In an automatic washer having means for containing a wash bath, hot and cold inlet valves connected to respective sources of hot and cold water, and means for delivering a combined flow of water from said valves to said wash bath, improved means for controlling the temperature of water delivered to said wash bath comprising:
   a temperature sensor mounted to sense the temperature of said combined flow of water to said wash bath;
   means forming a thermally semiconductive layer between said temperature sensor and said combined flow to provide a predetermined delayed response of said sensor to temperature changes of said combined flow;
   temperature control menas for establishing a desired water bath temperature;
   a valve control circuit connected to control said inlet valves, said circuit being connected to said sensor and said temperature control means and being responsive to signals therefrom to operate said valves such that an average temperature of said flow of water to said wash bath is substantially equal to said desired water bath temperature;

wherein said valve control circuit includes a window comparator arrangement to provide hysteresis in said valve control circuit.

5. In an automatic washer having means for containing a wash bath, a water temperature sensing assembly comprising:

a water inlet housing defining a water flow path to said wash bath;

a temperature sensor;

a hollow projection extending into said water flow path, said sensor being mounted within said hollow projection;

thermally semiconductive potting material within said projection, said sensor being embedded in said potting material to provide a predetermined thermal time delay between changes in the temperature of said water flow and the response of said sensor; and means for providing electrical contact with said sensor extending through said potting material;

wherein said hollow projection is trough shaped to form a relatively thin wall which extends transversely of the direction of said water flow path.

6. In an automatic washer having means for containing a wash bath, hot and cold inlet valves connected to respective sources of hot and cold water, means for selecting one of a plurality of wash temperature modes, and an inlet housing for delivering a combined flow of water from said valves to said wash bath, improved means for controlling the temperature of water delivered to said wash bath comprising:

a hollow projection formed in said inlet housing and extending into said combined flow;

a temperature sensor mounted within said hollow projection;

potting material in said hollow projection forming a thermally semiconductive layer between said sensor and said projection; and, a valve control circuit connected to said sensor, including biasing means in said circuit connected to said wash mode selecting means for selectively biasing said sensor, a window comparator arrangement connected to said sensor, and valve switching means connected to outputs of said window comparator arrangement.

7. An improved control means as claimed in claim 6, wherein said window comparator arrangement includes a voltage divider network and first and second comparators connected to respective first and second intermediate locations on said voltage divider network to provide first and second reference levels.

8. An improved control means as claimed in claim 7, further comprising first and second feedback resistors connected to said respective first and second comparators to prevent oscillation of the output signals from the respective comparators and thus provide a delay supplementing the delay of the sensor.

9. An improved control means as claimed in claim 6, further comprising: at least one buffer connected between said sensor and said window comparator arrangement to isolate changes in impedance caused by switching.

10. An improved control means as claimed in claim 6, further comprising: power conditioning means in said valve control circuit to provide power thereto.

* * * * *